(12) United States Patent
Pang

(10) Patent No.: US 11,010,362 B2
(45) Date of Patent: May 18, 2021

(54) METHOD AND SYSTEM FOR CACHING A GENERATED QUERY PLAN FOR TIME SERIES DATA

(71) Applicant: VMware, Inc., Palo Alto, CA (US)

(72) Inventor: Clement Pang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 212 days.

(21) Appl. No.: 15/952,098

(22) Filed: Apr. 12, 2018

(65) Prior Publication Data

US 2019/0065501 A1     Feb. 28, 2019

Related U.S. Application Data

(60) Provisional application No. 62/550,171, filed on Aug. 25, 2017.

(51) Int. Cl.
| | |
|---|---|
| *G06F 16/00* | (2019.01) |
| *G06F 16/22* | (2019.01) |
| *G06F 16/2455* | (2019.01) |
| *G06F 16/2458* | (2019.01) |
| *G06F 16/2453* | (2019.01) |
| *G06F 16/182* | (2019.01) |

(52) U.S. Cl.
CPC ........ *G06F 16/2272* (2019.01); *G06F 16/183* (2019.01); *G06F 16/2455* (2019.01); *G06F 16/2477* (2019.01); *G06F 16/24542* (2019.01); *G06F 16/24549* (2019.01); *G06F 16/24552* (2019.01)

(58) Field of Classification Search
CPC .......................... G06F 16/2272; G06F 16/183
USPC .................................................. 707/721, 714
See application file for complete search history.

(56) References Cited

U.S. PATENT DOCUMENTS

| | | | |
|---|---|---|---|
| 9,330,141 B2* | 5/2016 | Salch | G06F 16/183 |
| 2008/0114803 A1 | 5/2008 | Chinchwadkar et al. | |
| 2012/0005327 A1 | 1/2012 | Sato et al. | |
| 2012/0330924 A1* | 12/2012 | Rajan | G06F 16/2453 707/714 |
| 2013/0091266 A1 | 4/2013 | Bhave et al. | |
| 2013/0159321 A1 | 6/2013 | Bossman et al. | |
| 2017/0147639 A1* | 5/2017 | Lee | G06F 16/24539 |
| 2019/0057132 A1* | 2/2019 | Kim | G06F 16/2228 |

* cited by examiner

*Primary Examiner* — Chelcie L Daye

(57) ABSTRACT

In a method for caching a generated query plan for time series data, a query plan for time series data is generated based on a query comprising an expression, the query plan including a path of execution for resolving the query. The path of execution of the query plan to resolve the query is executed. A result of the path of execution is returned as a response to the query. The query plan is cached for retrieval and execution responsive to receiving another query that matches the query, such that the query plan can be used to resolve the another query.

17 Claims, 12 Drawing Sheets

METHOD AND SYSTEM FOR CACHING A GENERATED QUERY PLAN FOR TIME SERIES DATA

RELATED APPLICATION

This application claims priority to the provisional patent application having application Ser. No. 62/550,171, entitled "WAVEFRONT DP PLANNER," with filing date Aug. 25, 2017, by Clement Pang, and assigned to the assignee of the present application, the disclosure of which is hereby incorporated herein by reference in its entirety.

BACKGROUND

Management, monitoring, and troubleshooting in dynamic environments, both cloud-based and on-premises products, is increasingly important as the popularity of such products continues to grow. As the quantities of time-sensitive data grow, conventional techniques are increasingly deficient in the management of these applications. Conventional techniques, such as relational databases, have difficulty managing large quantities of data and have limited scalability. Moreover, as monitoring analytics of these large quantities of data often have real-time requirements, the deficiencies of reliance on relational databases become more pronounced.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Figure 1:
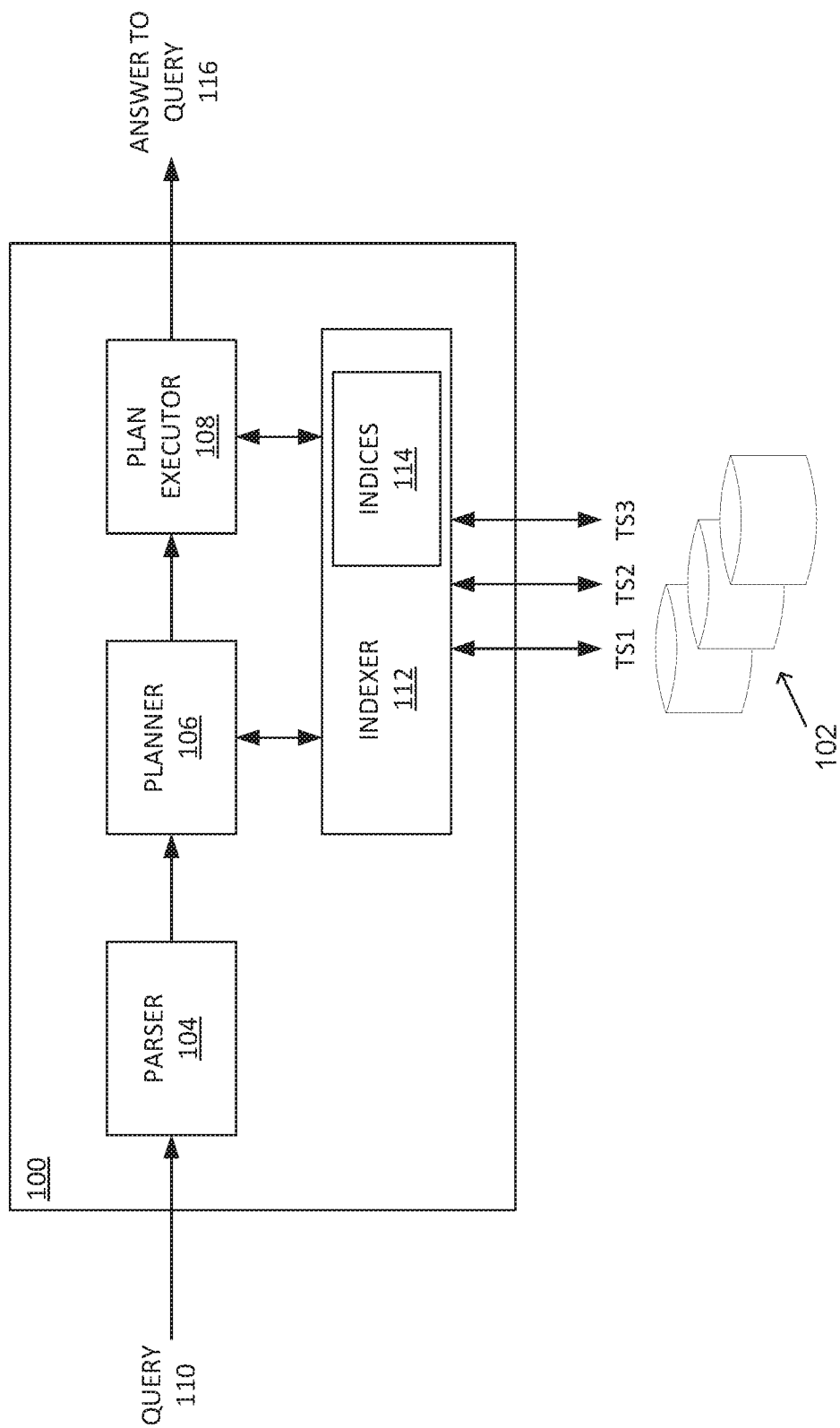
FIG. 1 is a block diagram illustrating a system for managing data including responding to a query regarding time series data, in accordance with embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "parsing," "determining," "executing," "evaluating," "selecting," "scanning," "caching," "refreshing," "generating," "returning," "replacing," "comparing," "performing," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems by improving the performance of a query of time series data. A multiple stage analysis of a plurality of paths of execution for resolving the query is performed. The multiple stage analysis results in a path of execution, including the operations for resolving the query that efficiently utilizes required resources, by implicitly determining intent of the query. The query planner can perform the analysis of each stage for multiple paths of execution concurrently.

For example, at each stage of the analysis, each executed path of execution is evaluated for the stage. If a particular path of execution is determined to be too costly (e.g., relative to other paths of execution), the particular path of execution may be ceased or paused, and other paths of execution can be pursued. In some embodiments, the query planner uses available statistics and underlying metrics to generate the query plan. The query plan provides a path of execution to a query executor for executing the query.

In some embodiments, a multiple stage analysis for a plurality of paths of execution is performed on a query. At completion of each stage for paths of execution that are executed, an evaluation is performed to determine whether to continue particular paths of execution and a next stage of the analysis is determined. The execution of a stage provides a state of each executed path of execution. The multiple stage analysis culls down the potential paths of execution, based on the evaluation, until one path of execution is selected as the query plan. The path of execution of the query plan includes a series of operations used for resolving the query, and is passed on to a query executor for execution and returning an answer to the query.

In some embodiments, the evaluation considers a cost of performing the stage for each path of execution. The cost can be based on one or more of a number of factors, such as execution time, processing load, memory usage, index reload time, etc. Costs of each stage for the multiple paths of execution are compared, and a subset of paths of execution is selected for continued execution and evaluation based on the cost. For paths of the subset of paths of execution, a next stage is determined for execution, and the multiple stage analysis is performed iteratively to reduce the subset of paths of execution to a single path of execution.

In one embodiment, a second stage for the subset of paths of execution is determined. In one embodiment, the second stage for the subset of paths of execution is determined by determining a presumptive cost associated with executing the second stage of the subsets of paths of execution. The second stage for the subset of paths of execution is determined based at least in part on the presumptive cost associated with executing the second stage of the subsets of paths of execution. The second stage for the subset of paths of execution is executed. The subset of paths of execution is evaluated after completion of the second stage. In one embodiment, a path of execution of the plurality of paths of execution is selected as the query plan based on the evaluating the subset of paths of execution.

In various embodiments, the executing the stages of the paths of execution includes accessing indices for locating a data source to satisfy the query. Time series data is collected and sorted into a plurality of indices to facilitate retrieval of the source time series data (e.g., which data stream to access or which data store to access). The indices are selectively refreshed based on a determination as to whether an index is helpful in reducing the solution set. Reloading and/or refreshing an index into memory can be a costly (e.g., time intensive) operation. Therefore, selectively refreshing indices based on an analysis of the respective importance of an index can decrease the processing time, and therefore improve efficiency of obtaining the solution set for the query.

In some embodiments, a generated query plan including a path of execution for resolving a query is stored for later retrieval responsive to receiving a matching query. Saving and accessing a query plan for a matching query improves the performance of the computer system by not requiring a real-time multiple stage analysis of the query. In some embodiments, the stored query plan is evaluated offline to confirm whether the generated query plan should be saved or it should be replaced with another query plan. For example, the multiple stage analysis of a query may result in a particular query plan as the least costly query plan. However, due to the culling of costly paths of execution during the multiple stage query analysis, there may be less costly path of execution. Offline, in a non-time sensitive environment, the path of execution of the query plan can be compared to other paths of execution (e.g., without culling paths during analysis). An aggregate cost can be determined for each path of execution, and the aggregate cost for each path of execution can be compared. If the stored path of execution is not the least costly path of execution, the query plan can be replaced with another path of execution that is less costly.

Example System for Query Plan Generation

FIG. 1 is a block diagram illustrating an embodiment of a system 100 for managing data including responding to a query 110 regarding time series data. In one embodiment, system 100 generates a query plan for the time series data based on the query 110. System 100 includes a parser 104, a planner 106, and an executor 108. System 100 can be implemented by a query execution engine configured to parse a query at parser 104, produce a query execution plan at planner 106, fetch time series data and run the time series data through processing operations, and determine an answer or response to the query at executor 108.

In the example shown in FIG. 1, a query 110 is received. In one embodiment, the query 110 is provided by a user via a client. Time series data is provided by storage devices 102. The storage devices 102 store and output time series data, e.g., TS1, TS2, TS3, etc. In various embodiments, the storage devices 102 include a storage system such as time series database (TSDB). The data can include times series data, which may be discrete or continuous. For example, the data can include live data fed to a discrete stream, e.g., for a standing query. Continuous sources can include analog output representing a value as a function of time. With respect to processing operations, continuous data may be time sensitive, e.g., reacting to a declared time at which a unit of stream processing is attempted, or a constant, e.g., a 5V signal. Discrete streams can be provided to the processing operations in timestamp order. It should be appreciated that the time series data may be queried in real-time (e.g., by accessing the live data stream) or offline processing (e.g., by accessing the stored time series data).

In some embodiments, time series data includes a numerical measurement of a system or activity that can be collected and stored as a metric (also referred to as a "stream"). For example, one type of metric is a CPU load measured over time. Other examples include, service uptime, memory usage, etc. It should be appreciated that metrics can be collected for any type of measurable performance of a system or activity. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like. It should be appreciated that the preceding examples are non-limiting, and that metrics analysis can be utilized in many different types of use cases and applications.

In accordance with some embodiments, a data point in a stream (e.g., in a metric) includes a name, a source, a value, and a time stamp. Optionally, a data point can include one or more tags (e.g., point tags). For example, a data point for a metric may include:

A name—the name of the metric (e.g., CPU_idle, service.uptime)

A source—the name of an application, host, container, instance, or other entity generating the metric (e.g., web_server_1, app1, app2)

A value—the value of the metric (e.g., 99% idle, 1000, 2000)

A timestamp—the timestamp of the metric (e.g., 1418436586000)

One or more point tags (optional)—custom metadata associated with the metric (e.g., location=las_vegas, environment=prod)

Time series data is received at indexer 112 for generating indices 114. Time series data is collected and sorted into a plurality of indices 114 to facilitate retrieval of the source time series data (e.g., which data stream to access or which data store to access). It should be appreciated that indexer 112 can generate many different types of indices 114 for facilitating data retrieval. For example, indices 114 can include one or more of a prefix index, a trigram index, a two-tier index, and a three-tier index. A prefix index is an index that includes prefixes of searchable terms. A trigram index is an index that includes three letter combinations of searchable terms. A two-tier index is an index that relates two searchable dimensions (e.g., metric to host or host to metric). A three-tier index is an index that relates three searchable dimensions (e.g., metric to host to point tag or host to metric to point tag).

Query 110 is received for searching the time series data. A query can include elements that define searchable parameters of the time series data. For example, the query can include elements defining terms related to metrics, sources, values, timestamps, and/or point tags for isolating and returning relevant results. The parser 104 receives a query 110 and parses the query for a predicate (e.g., elements and operators). The predicate forms at least part of a basis for generating a query plan. For instance, consider the example query:

ts("*graf*", host="*2*" and tag=app and (status=production or role=app) and cluster=mon and cpu=cpu-total)

The example query is parsed into the predicate including the elements and operators:

metric="*graf*" AND
host="*2*" AND
(status=production OR role=app) AND
cluster=mon AND
cpu=cpu-total The planner 106 receives the parsed elements and operators of query 110 and generates a query plan for retrieval of relevant time series data that resolves the query 110. The planner 106 determines operations to be performed on the relevant time series data to retrieve a result of the query 110.

In operation, the system 100 receives a query. Planner 106 generates a query plan for determining what to retrieve from time series databases 102 based on the query. For example, planner 106 determines how many scans to make on the time series database(s). The planner 106 then hands off commands (e.g., a query plan) to executor 108 to perform an execution phase, e.g., beginning execution of the query 110. The executor 108 then outputs an answer to the query. Although shown as a single stream, the answer to the query can include one or more streams.

Figure 2:
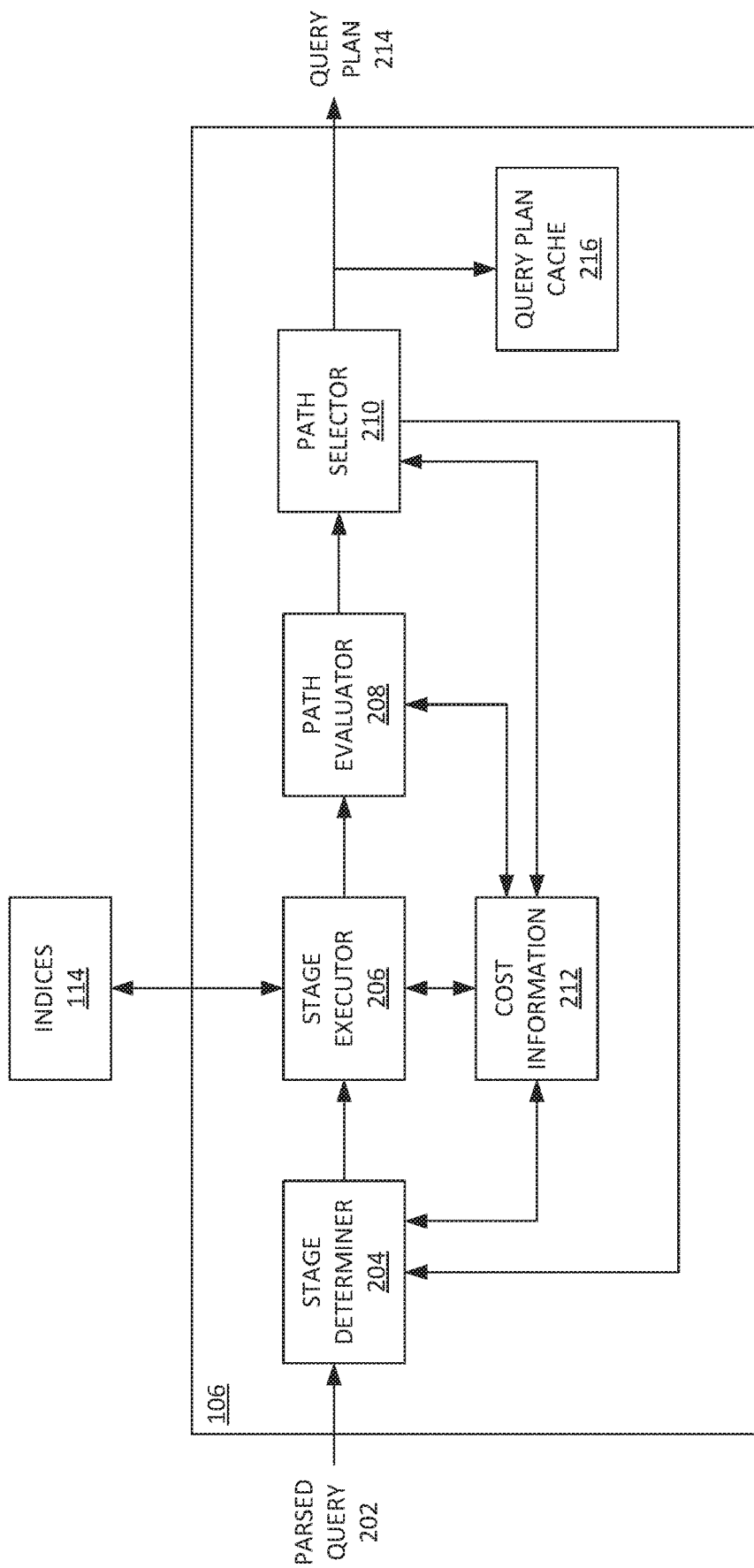
FIG. 2 is a block diagram illustrating a planner for generating a query plan for responding to a query regarding time series data, in accordance with embodiments.

FIG. 2 is a block diagram illustrating an embodiment of a planner 106 for generating a query plan for responding to a query 110 regarding time series data. In one embodiment, planner 106 generates a query plan for the time series data based on the parsed query 202. Planner 106 includes stage determiner 204, stage executor 206, path evaluator 208, and path selector 210. In some embodiments, planner 106 also includes cost information 212. In some embodiments, planner 106 also includes query plan cache 216.

Stage determiner 204 receives the parsed query 202 (e.g., from parser 104) and determines the first stage for a plurality of paths of execution of the query. A query including multiple elements and/or operators has multiple possible paths of execution for resolving the query. Stage determiner 204 determines a stage by analyzing the elements and identifying possible paths of execution for each element. For example, for a metric element of "*graf*", where * is a wildcard, multiple trigram lookups can be performed for accessing a trigram index—"gra" and "raf". A prefix scan of a prefix index can also be performed. In another example, for a point tag element of "cluster=mon", a three-tier tag to metric to host index can be accessed for resolving this stage of the possible paths of execution.

For the example query above, the six elements and operators are split into six possible paths of execution, one for each element. These paths of execution can each have one or more possible first stages. Stage determiner 204 selects a next stage based at least on the elements. In some embodiments, stage determiner 204 access cost information 212 to retrieve cost information for use in determining a next stage. For example, costs information 212 can include a cost for accessing a particular index of indices 114 (e.g., processing time). It should be appreciated that the cost information can be either based on stored historical values or include default or projected values. For example, if an element of a query can be resolved by accessing one of multiple indices, stage determiner 204 can base the determination for which index to access (e.g., the operations of a stage for a path of execution) based on cost information 212. For instance, if accessing a first index is less costly (e.g., can be performed quicker) than accessing a second index, stage determiner 204 can determine the first stage to be a lookup of the first index.

Stage determiner 204 forwards the stage information to stage executor 206 for execution of the stages for the paths of execution. In some embodiments, stage executor 206 is operable to execute the stages for the multiple paths of execution concurrently (e.g., in parallel). Stage executor 206 executes the stages by accessing the pertinent index of indices 114 for each stage. The index lookup/expansion is executed and a cost (e.g., time of execution) of performing each stage is determined. In one embodiment, the cost for executing a stage is stored in cost information 212 for later usage (e.g., by stage determiner 204 and/or path evaluator 208).

In one embodiment, stage executor 206 is operable to control selective refreshing of particular indices of indices 114. For example, stage executor 206 is configured to make a determination as to a potential usefulness of particular indices in reducing a solution set for the stage of a path of execution of the plurality of paths of execution.

Figure 3A:
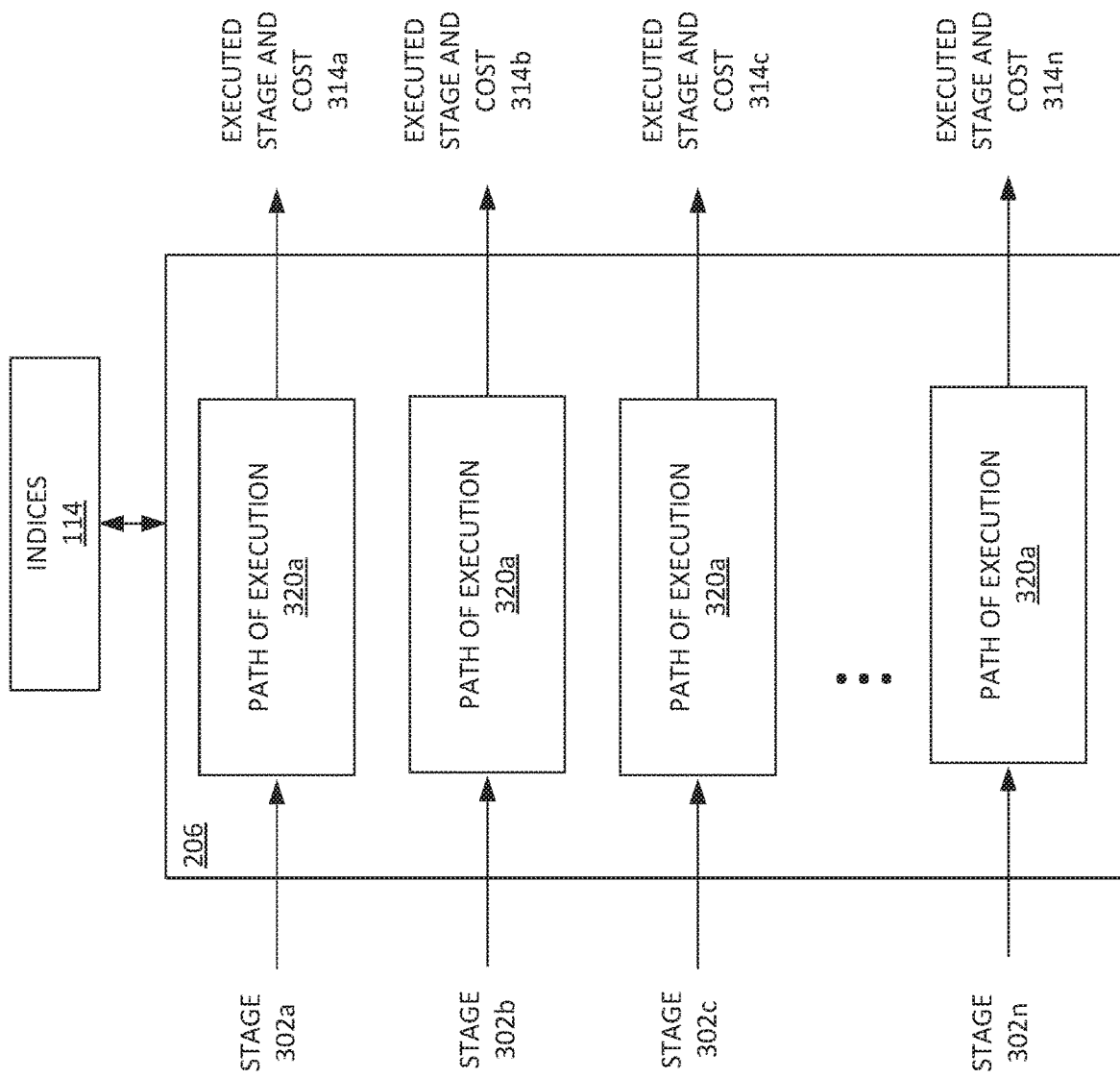
FIG. 3A is a block diagram illustrating a stage executor for executing multiple paths of execution during query plan generation, in accordance with embodiments.

FIG. 3A is a block diagram illustrating an example stage executor 206 for executing operations of stages for multiple paths of execution 320a-n during query plan generation, in accordance with embodiments. It should be appreciated that stage executor 206 can perform stage concurrent (e.g., parallel) execution for any number of paths of execution, of which the illustrated embodiment is an example. Stage information 302a-n (e.g., an output of stage determiner 204) is received for each path of execution 320a-n, respectively. It should be appreciated that an embodiment of the operations of paths of execution 320a-n is illustrated in path of execution 320 of FIG. 3B.

Figure 3B:
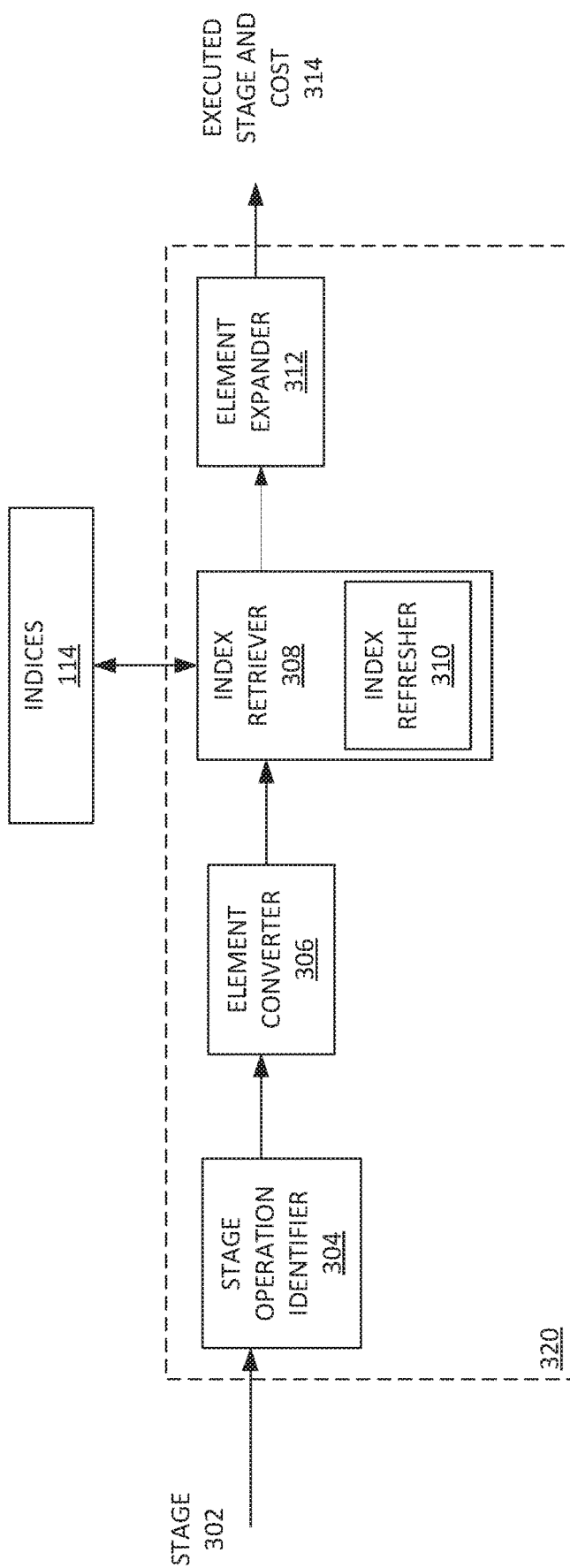
FIG. 3B is a block diagram illustrating stage execution for executing operations for stages of one path of execution during query plan generation, in accordance with embodiments.

FIG. 3B is a block diagram illustrating stage execution for executing operations for stages of one path of execution 320 during query plan generation, in accordance with embodiments. It should be appreciated that any combination of the operations of path of execution 320 may be utilized in paths of execution 320a-n of FIG. 3A.

Stage information 302 (e.g., an output of stage determiner 204) is received at stage operation identifier 304. Stage operation identifier 304 is configured to determine the operations of a particular stage of the plurality of paths of operation. For instance, stage operation identifier 304 is configured to determine which particular index of indices 114 is accessed by a particular stage during stage execution for path of execution 320.

In some embodiments, path of execution 320 includes element converter 306 that is configured to convert an element into a format that is searchable via an index. Identifiers may be used in the index and/or the element, requiring conversion from an identifier to an element or an element to an identifier. For example, where the element is a metric, a metric identifier may be used in the index (e.g., a metric to host index). Therefore, the metric is converted to a metric identifier for purposes of scanning the index.

Index retriever 308 receives the searchable element (or element identifier) and accesses the relevant index identified by stage operation identifier 304. In some embodiments, an index of indices 114 is selectively refreshed by index refresher 310 based on a potential usefulness of the index in reducing a solution set for the stage of a path of execution of the plurality of paths of execution. Time series data may be continually received (e.g., from storage devices 102), which may necessitate a refresh and/or reload of the indices to account for the new time series data. However, if an index is not accessed during a stage of a path of execution, there no need to refresh the index. Moreover, even if an index is accessed, if the index does not contribute to a reduction of the solution set, there is no need to refresh the index. In one embodiment, historical information may be used in determining whether an index has contributed to a reduction of the solution set for operations of a stage (e.g., for a matching or similar stage). In such embodiments, index refresher 310 may include or have access to information regarding whether an index will contribute to a reduction of the solution set.

Element expander 312 performs expansion of the element of stage 302 into the accessed index of indices 114, for determining a reduced solution set of the query. In one embodiment, an index scan is performed using the element (or element identifier) against the index, and a stage result is generated. In some embodiments, a cost (e.g., processing time) of performing the element expansion is determined. Executed stage results and cost 314 are output for path of execution 320. It should be appreciated that executed stage results can include a reduced solution set, a null set (no solutions), a non-reduced solution set, etc.

With reference to FIG. 3A, executed stage results and costs 314a-n are generated for each path of execution 320a-n, respectively. Executed stage results and costs 314a-n are provided to path evaluator 208. In one embodiment, the costs are also stored in cost information 212 as historical cost information for operations of a particular stage. Cost information 212 can be retrieved by stage determiner 204, path evaluator 208, and or path selector 210 for use in evaluating path stages.

Path evaluator 208 evaluates the plurality of paths of execution after completion of each stage. In some embodiments, the evaluation is based on the cost of performing the respective stages of each path of execution. For example, as time series data is often time-sensitive, the cost used in evaluating each path of execution is the processing time for performing the stage for each path of execution. For instance, the processing time may include the element conversion, the index access, an index refresh (if needed), and the element expansion. The cost may be the total processing to for each stage.

The evaluation for each path of execution is provided to path selector 210. Based on the evaluating, a subset of paths of execution is selected for continued execution and evaluation. In one embodiment, selecting the subset of paths of execution for continued execution and evaluation includes selecting a path of execution having a lowest cost of execution of the first stage for inclusion within the subset of paths of execution. Additional paths of execution having a cost that satisfies a threshold for inclusion within the subset of paths of execution are selected.

In one embodiment, the threshold includes a multiple of the lowest cost of execution such that paths of execution for which the cost is within the multiple of the lowest cost of execution are selected for inclusion within the subset of paths of execution. For example, if the cost used in evaluating the paths of execution is processing time, and the path of execution with the lowest processing time has a processing time of 3 milliseconds, all paths of execution with 3× of processing time (e.g., 9 milliseconds) are selected for continued execution and evaluation. In another embodiment, the threshold includes a number of paths that have a cost closest to the lowest cost of execution such that paths of execution the number of paths closest to the lowest cost of execution are selected for inclusion within the subset of paths of execution. For example, the three lowest cost paths of execution can be selected for further execution and evaluation. It should be appreciated that different thresholds or combinations of thresholds can be used, as will be understood by those of skill in the art, and that the described examples or intended to be non-limiting.

Path selector 210 is configured to select a subset of paths of execution for continued execution and evaluation, and provides the selected subset of paths of execution to stage determiner 204. The execution of the subset of paths of execution is processed by stage determiner 204, stage executor 206, path evaluator 208, and path selector 210, as described, iteratively until a single path of execution remains. The single path of execution as output by path selector 210 is output as query plan 214.

With reference to FIG. 1, the executor 108 handles an "execution phase" in which operations are performed on time series data to generate an answer to the query. In various embodiments, the executor 108 executes a query plan 214 from planner 106 and performs operations on the time series data based on the query plan, where the query plan includes a path of execution for resolving query 110. For example, one or more executors can perform the operation on the time series data concurrently. In various embodiments, the executor 108 responds to a query about the time series data and outputs an answer 116 to the query. Although shown as separate components in FIG. 1, the planner 106 and the executor 108 can be implemented as a single component. The techniques described herein can be performed by the planner 106 and/or the executor 108.

With reference to FIG. 2, query plan 214 is also cached at query plan cache 216 for subsequent use. Query plan 214 is cached in a way such that the associated query that resulted in the generation of query plan 214 is searchable. In one embodiment, prior to executing a query, the query is searched to determine if the query matches a query associated with a previously cached query plane. Responsive to determining that a received query matches the query associated with the query plan, the query plan is retrieved. The query plan can then be used for executing the query without needing to generate a query plan, thereby improving the performance of the computer system.

In one embodiment, subsequent to generating the query plan in the multiple stage manner as described above, the path of execution of query plan 214 is evaluated against other possible paths of execution without iteratively reducing possible solution sets. For example, while the multiple stage execution of the query as described above may be performed in real time under time-sensitive demands (e.g., a result to the query is requested), the path of execution of the query plan 214 can be evaluated offline in a non-time sensitive environment by evaluating against other possible fully executed paths of execution.

For example, in one embodiment, a cost for each of the plurality of paths of execution for the query is determined. This can be an aggregate cost for all stages of each path of execution. It should be appreciated that the process described above may cease evaluation of a particular path of execution (e.g., the path of execution did not satisfy a cost threshold) that ultimately could be a lowest cost path of execution. Therefore, subsequent evaluation of the path of execution of the query plan may result in a lower cost path of execution. In one embodiment, determining whether to replace the query plan as cached with another query plan including a path of execution of the plurality of paths of execution includes comparing a cost of the path of execution of the query plan to costs for the plurality of paths of execution for the query. If a cost of a path of execution of the plurality of paths of execution is less than the cost of the path of execution of the query plan as cached, the path of execution of the query plan as cached is replaced with the path of execution of the plurality of paths of execution.

Replacing query plan 214 with another query plan having a lower cost of execution at query plan cache 216 allows for continued improvement of the cost (e.g., processing time) of an executed query. For instance, if a query is received that matches a query that resulted in a particular query plan, the query plan can be selected for execution without regenerating the query plan. Moreover, if the query plan generated was evaluated subsequently against all other possible paths of execution, resulting in the query plan being replaced by a lower cost (e.g., better performing) query plan, receiving the query will result in the execution of the replacement query plan, thereby improving the performance of the query processing by using a previously generated query plan that was evaluated against all other possible paths of operation, providing the best performing query plan.

Figure 4:
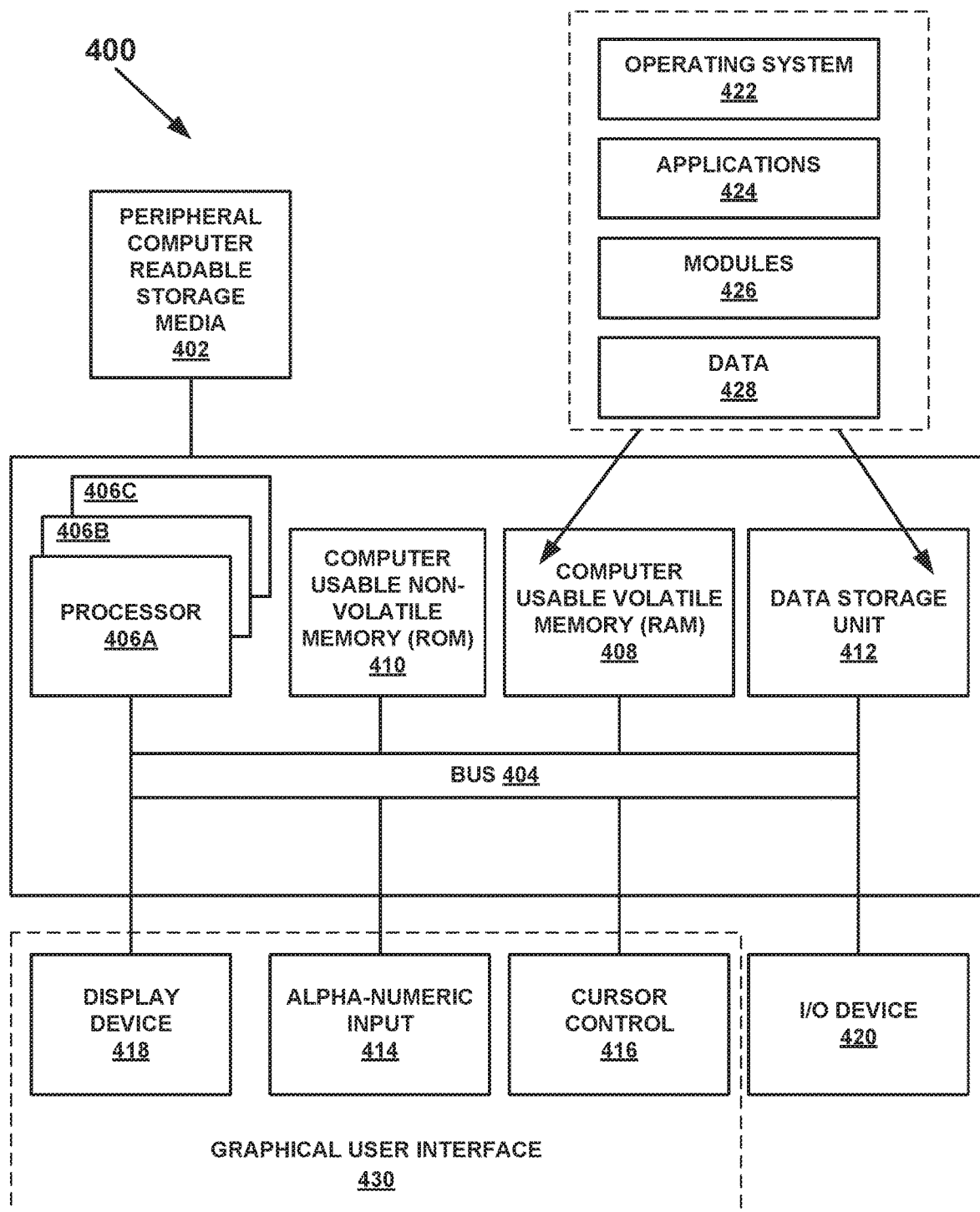
FIG. 4 is a block diagram of an example computer system upon which embodiments of the present invention can be implemented.

FIG. 4 is a block diagram of an example computer system 400 upon which embodiments of the present invention can be implemented. FIG. 4 illustrates one example of a type of computer system 400 (e.g., a computer system) that can be used in accordance with or to implement various embodiments which are discussed herein.

It is appreciated that computer system 400 of FIG. 4 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, standalone computer systems, media centers, handheld computer systems, multi-media devices, and the like. In some embodiments, computer system 400 of FIG. 4 is well adapted to having peripheral tangible computer-readable storage media 402 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 400 of FIG. 4 includes an address/data bus 404 for communicating information, and a processor 406A coupled with bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled with bus 404 for storing information and instructions for processors 406A, 406B, and 406C. Computer system 400 also includes computer usable non-volatile memory 410, e.g., read only memory (ROM), coupled with bus 404 for storing static information and instructions for processors 406A, 406B, and 406C. Also present in computer system 400 is a data storage unit 412 (e.g., a magnetic or optical disc and disc drive) coupled with bus 404 for storing information and instructions. Computer system 400 also includes an alphanumeric input device 414 including alphanumeric and function keys coupled with bus 404 for communicating information and command selections to processor 406A or processors 406A, 406B, and 406C. Computer system 400 also includes an cursor control device 416 coupled with bus 404 for communicating user input information and command selections to processor 406A or processors 406A, 406B, and 406C. In one embodiment, computer system 400 also includes a display device 418 coupled with bus 404 for displaying information.

Referring still to FIG. 4, display device 418 of FIG. 4 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, touch screen, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. Computer system 400 is also well suited to having a cursor directed by other means such as, for example, voice commands. In various embodiments, alphanumeric input device 414, cursor control device 416, and display device 418, or any combination thereof (e.g., user interface selection devices), may collectively operate to provide a graphical user interface (GUI) 430 under the direction of a processor (e.g., processor 406A or processors 406A, 406B, and 406C). GUI 430 allows user to interact with computer system 400 through graphical representations presented on display device 418 by interacting with alphanumeric input device 414 and/or cursor control device 416.

Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet. In one embodiment, I/O device 420 includes a transmitter. Computer system 400 may communicate with a network by transmitting data via I/O device 420.

Referring still to FIG. 4, various other components are depicted for computer system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

Example Methods of Operation

The following discussion sets forth in detail the operation of some example methods of operation of embodiments. With reference to FIGS. 5 through 10, various flow diagrams illustrate example procedures used by various embodiments. The flow diagrams of FIGS. 5 through 10 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 400). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagrams, such procedures are examples. That is, embodiments are well suited to performing various other procedures or variations of the procedures recited in the flow diagrams. Likewise, in some embodiments, the procedures in the flow diagrams of FIGS. 5 through 10 may be performed in an order different than presented and/or not all of the procedures described in one or more of these flow diagrams may be performed. It is further appreciated that procedures described in the flow diagrams of FIGS. 5 through 10 may be implemented in hardware, or a combination of hardware with firmware and/or software provided by computer system 400.

Figure 5:
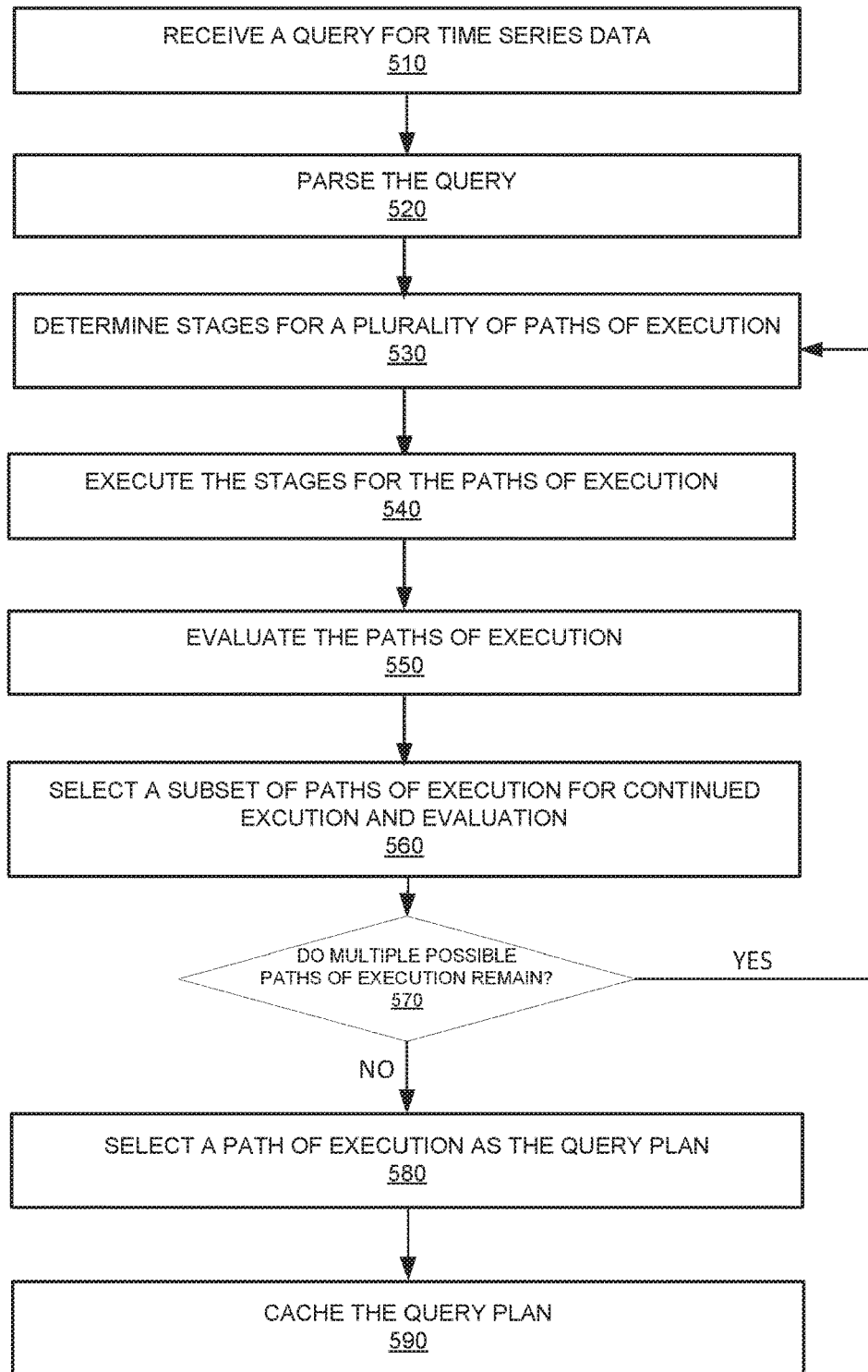
FIG. 5 depicts a flow diagram for generating a query plan for time series data, according to various embodiments.

FIG. 5 depicts a flow diagram 500 for generating a query plan for time series data, according to various embodiments. At procedure 510 of FIG. 5, a query for time series data is received (e.g., at system 100 of FIG. 1), the query including elements. In one embodiment, the elements include at least one of a metric, a host, and a tag. At procedure 520, the query is parsed to identify the elements and operators between the elements (e.g., at parser 104 of FIG. 1).

At procedure 530, stages for a plurality of paths of execution are determined based at least in part on the elements and the operators (e.g., at planner 106 and/or stage determiner 204). In some embodiments, the elements and operators identify which index is accessed for a stage, thereby identifying the stages. Procedure 530 can also utilize presumptive cost information in determining stages for paths of execution. For each path of execution, there may be multiple options of stages to perform. In one embodiment, procedure 530 is performed according to flow diagram 600 of FIG. 6A. At procedure 602 of flow diagram 600, a presumptive cost of executing the stage is determined for each path of execution. In one embodiment, the presumptive cost is based on historical values. In another embodiment, the presumptive cost is based on a default or projected value. At procedure 604, the stage is determined based at least in part on the presumptive cost. For example, the presumptive cost for each possible stage for a path of execution can be compared to each other and/or a threshold. A stage having the lowest cost can be selected as the next stage. If all possible stages do not satisfy a threshold (e.g., are too costly), the path of execution may be paused or ceased.

At procedure 540, a stage for the plurality of paths of execution is executed (e.g., at stage executor 206). In one embodiment, the stages for the plurality of paths of execution are executed concurrently (e.g., in parallel). In one embodiment, procedure 540 is performed according to flow diagram 610 of FIG. 6B. At procedure 612 of flow diagram 610, an index to access is determined based on an element of the path of execution. At procedure 614, the index is scanned to identify a culled solution set based on the element for resolving the query. In various embodiments, the index is one of a prefix index, a trigram index, a two-tier index, and a three-tier index.

Figure 6A:
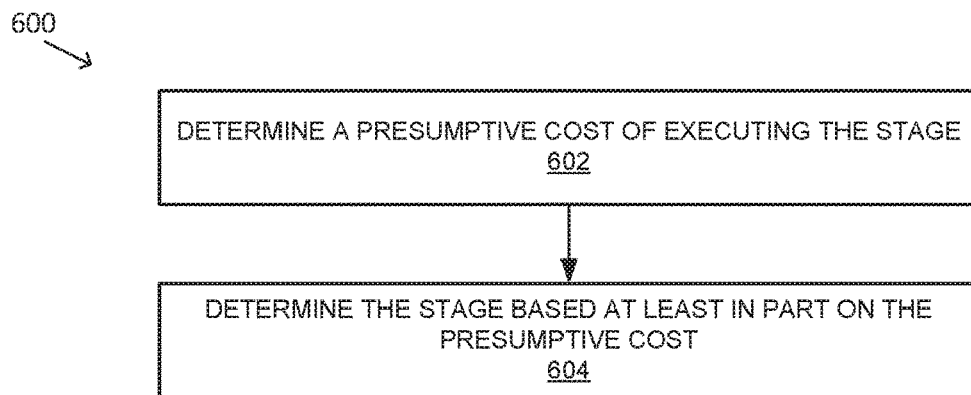
FIGS. 6A through 6E depict flow diagrams of operations for generating a query plan for time series data, according to various embodiments.
Figure 6B:
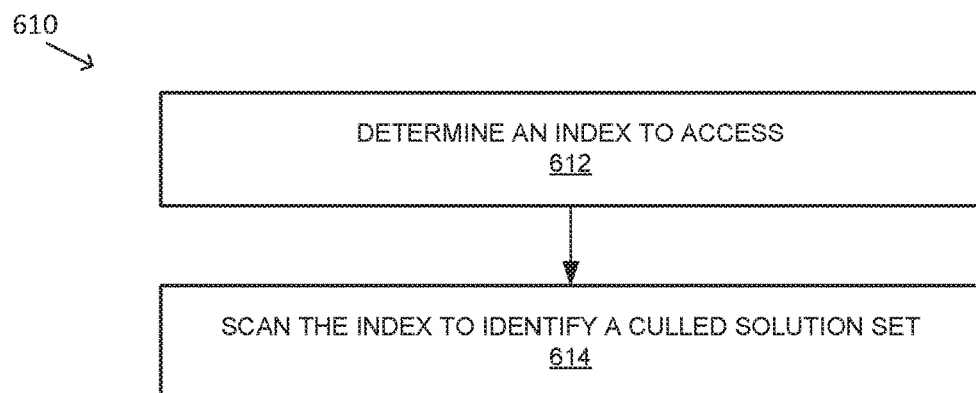
Figure 6C:
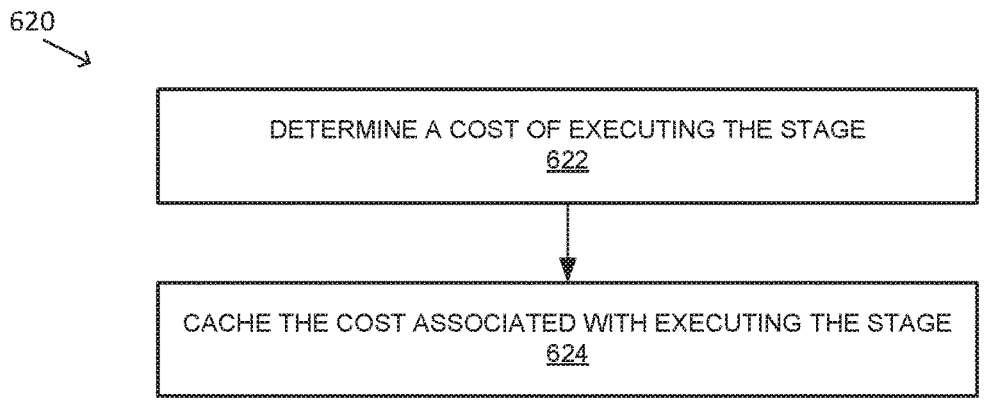
Figure 6D:
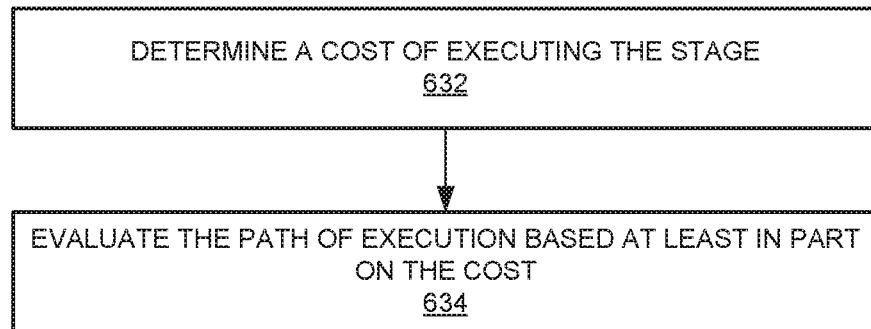
Figure 6E:
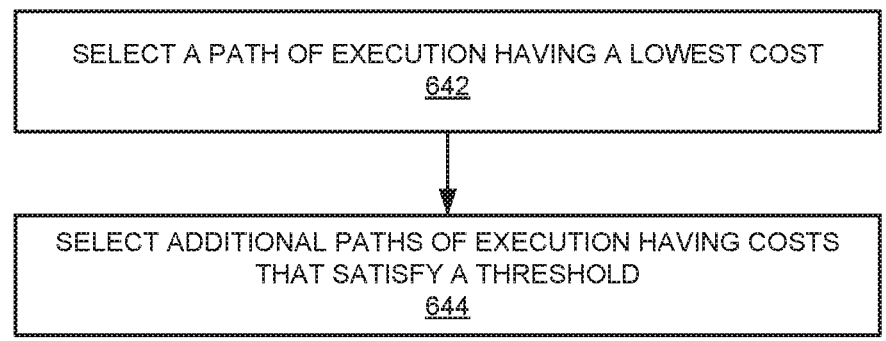

In another embodiment, procedure 540 is performed according to flow diagram 620 of FIG. 6C. At procedure 622 of flow diagram 620, for each path of execution, a cost associated with executing the first stage of the path of execution is determined. At procedure 624, the cost associated with executing the first stage of the path of execution is cached. It should be appreciated that procedure 540 may include the procedures of both flow diagrams 610 and 620.

At procedure 550, the plurality of paths of execution is evaluated after completion of the stage (e.g., at path evaluator 208). In one embodiment, procedure 550 is performed according to flow diagram 630 of FIG. 6D. At procedure 632 of flow diagram 630, for each path of execution, a cost associated with executing the at least a first stage of the path of execution is determined. At procedure 634, the path of execution is evaluated based at least in part on the cost associated with executing the at least a first stage of the path of execution.

At procedure 560, based on the evaluating, a subset of paths of execution is selected for continued execution and evaluation (e.g., at path selector 210). In one embodiment, procedure 560 is performed according to flow diagram 640 of FIG. 6E. At procedure 642 of flow diagram 640, a path of execution having a lowest cost of execution of the first stage for inclusion within the subset of paths of execution is selected. At procedure 644, additional paths of execution having a cost that satisfies a threshold for inclusion within the subset of paths of execution are selected. In one embodiment, the threshold includes a multiple of the lowest cost of execution such that paths of execution for which the cost is within the multiple of the lowest cost of execution are selected for inclusion within the subset of paths of execution. In another embodiment, the threshold includes a number of paths that have a cost closest to the lowest cost of execution such that paths of execution the number of paths closest to the lowest cost of execution are selected for inclusion within the subset of paths of execution.

At procedure 570, it is determined whether multiple possible paths of execution remain. If multiple paths of execution remain for execution and analysis, flow diagram 500 returns to procedure 530 for continued execution and evaluation of the subset of multiple paths of execution. If a single path of execution remains or the subset of paths is reduced to a single path based on the threshold analysis, as shown at procedure 580, the remaining path of execution is selected as the query plan. The path of operation of the query plan is the selected path of execution for locating a data source to satisfy the query. In one embodiment, as shown at procedure 590, the query plan is cached (e.g., at query plan cache 216).

Figure 7:
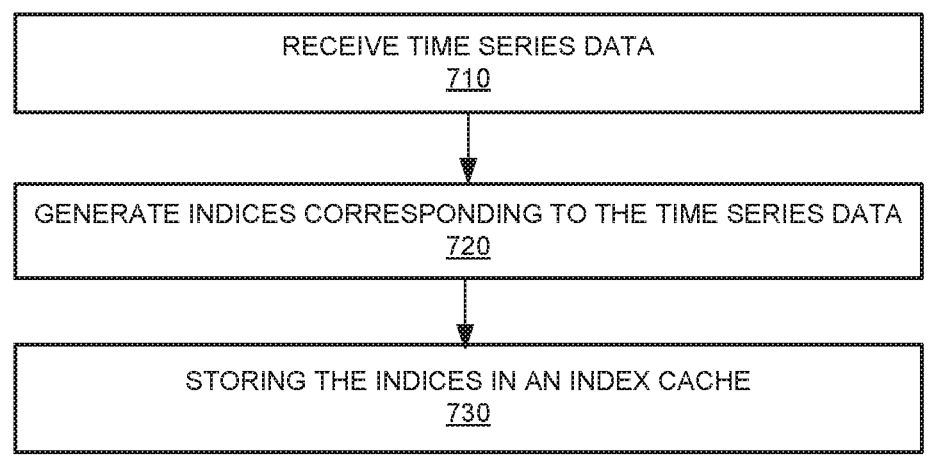
FIG. 7 depicts a flow diagram for generating indices for time series data, according to various embodiments.

In accordance with various embodiments, indices are accessed for performing the multiple stage analysis of the plurality of paths of operation for locating a data source to satisfy the query. Time series data is collected and sorted into a plurality of indices to facilitate retrieval of the source time series data (e.g., which data stream to access or which data store to access). FIG. 7 depicts a flow diagram 700 for generating indices for time series data, according to various embodiments. At procedure 710 of flow diagram 700, time series data (e.g., TS1, TS2, and TS3 from storage devices 102) is received. At procedure 720, indices corresponding to the time series data are generated (e.g., by indexer 112). At procedure 730, the indices are stored in an index cache (e.g., indices 114 of FIG. 1).

Figure 8:
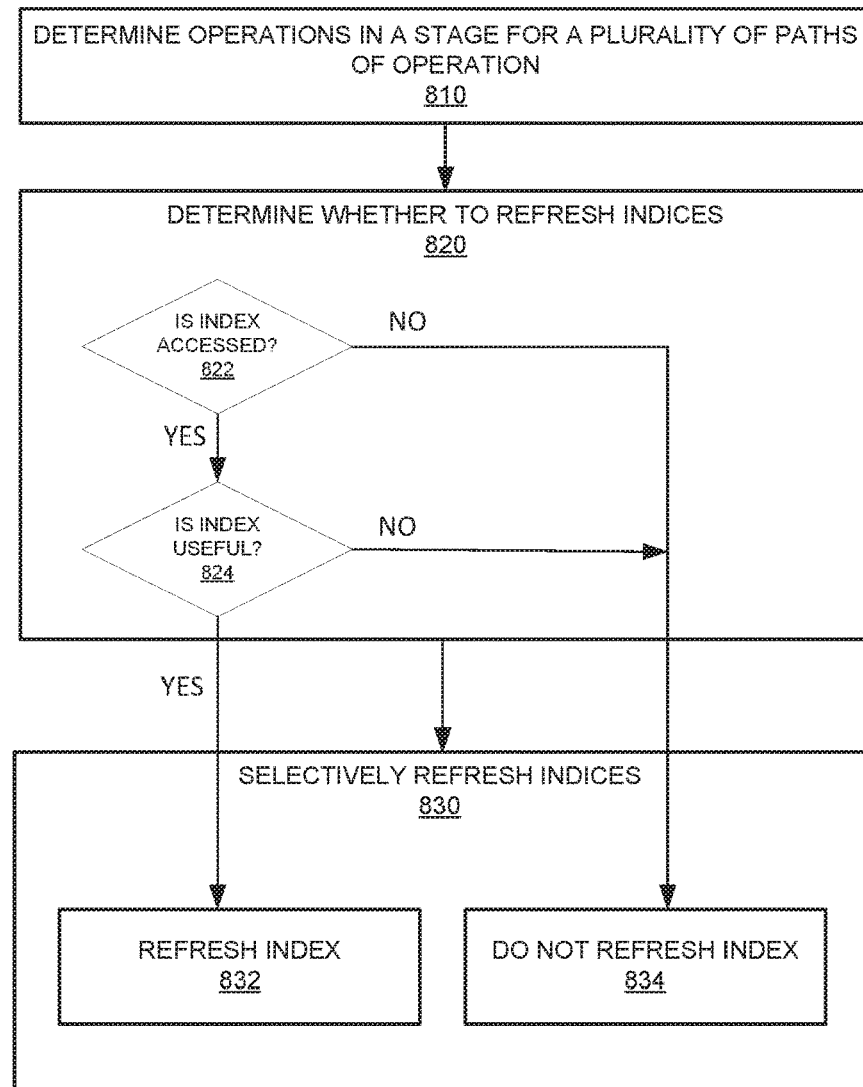
FIG. 8 depicts a flow diagram for dynamic refresh of an index during query path generation for time series data, according to various embodiments.

The indices are selectively refreshed based on a determination as to whether an index is helpful in reducing the solution set. Reloading and/or refreshing an index into memory can be a costly (e.g., time intensive) operation. Therefore, selectively refreshing indices based on an analysis of the respective importance of an index can decrease the processing time, and therefore improve efficiency of obtaining the solution set for the query. FIG. 8 depicts a flow diagram 800 for dynamic refresh of an index during query path generation for time series data, according to various embodiments.

At procedure 810 of flow diagram 800, during generation of a query plan based on the query, operations in a stage for a plurality of paths of execution are determined based at least in part on the elements of the query, wherein execution of the stage includes accessing an index of a plurality of indices. In various embodiments, procedure 810 is performed at procedure 530 and/or procedure 612. In one embodiment, the query plan is generated in real-time.

At procedure 820, it is determined whether to refresh indices of a plurality of indices based on a potential usefulness of the indices in reducing a solution set for the stage of a path of execution of the plurality of paths of execution. In one embodiment, as shown at procedure 822, for each index of the plurality of indices, it is determined whether an index of the plurality of indices is accessed during execution of the stage for at least one path of execution of the plurality of paths of execution. If the index is not accessed during execution of the stage for at least one path of execution of the plurality of paths of execution, it is determined that the index is not useful for reducing the solution set for the stage of a path of execution of the plurality of paths of execution, and flow diagram 800 proceeds to procedure 834.

If the index is accessed during execution of the stage for at least one path of execution of the plurality of paths of execution, as shown at procedure 824, it is determined whether the index is useful for reducing the solution set the solution set for the stage of a path of execution of the plurality of paths of execution. If the index is useful for reducing the solution set the solution set for the stage of a path of execution of the plurality of paths of execution, flow diagram 800 proceeds to procedure 832. Alternatively, if the index is not useful for reducing the solution set the solution set for the stage of a path of execution of the plurality of paths of execution, flow diagram 800 proceeds to procedure 834.

At procedure 830, the indices are selectively refreshed based on the determination. If the index is not useful for reducing the solution set for the stage of a path of execution of the plurality of paths of execution, as shown at procedure 834, the index is not refreshed. If the index is useful for reducing the solution set for the stage of a path of execution of the plurality of paths of execution, as shown at procedure 832, the index is refreshed. In some embodiments, if it is determined to refresh indices of the plurality of indices, the indices to be refreshed are retrieved from the index cache. The stage for the plurality of paths of execution is then executed (e.g., procedure 540 is then executed).

In some embodiments, a generated query plan including a path of execution for resolving a query is stored for later retrieval responsive to receiving a matching query. Saving and accessing a query plan for a matching query improves the performance of the computer system by not requiring a real-time multiple stage analysis of the query.

In accordance with various embodiments, in a method for caching a generated query plan for time series data, a query plan for time series data is generated based on a query including an expression, the query plan including a path of execution for resolving the query (e.g., at flow diagram 500 of FIG. 5). The path of execution of the query plan to resolve the query is executed. A result of the path of execution is returned as a response to the query. The query plan is cached for retrieval and execution responsive to receiving another query that matches the query, such that the query plan can be used to resolve the another query (e.g., at procedure 590 of flow diagram 500).

Figure 9:
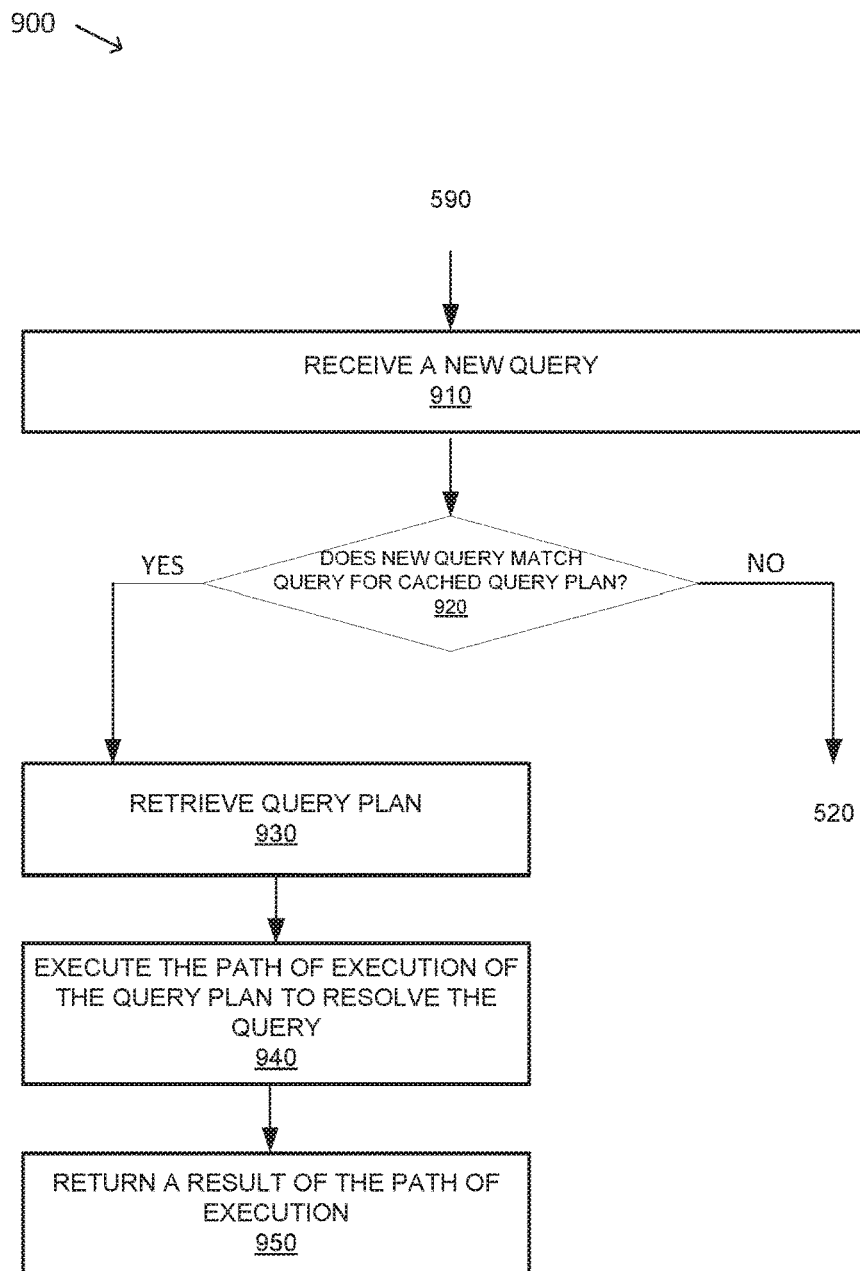
FIG. 9 depicts a flow diagram for using a cached query plan for time series data, according to various embodiments.

FIG. 9 depicts a flow diagram 900 for using a cached query plan for time series data, according to various embodiments. At procedure 910, a new query is received. At procedure 920, it is determined whether the new query matches the query for the cached query plan. If the new query does not match the query associated with the query plan, a multiple stage analysis is performed on the new query (e.g., flow diagram 900 proceeds to procedure 520 of flow diagram 500). Responsive to determining that a received query matches the query associated with the query plan, as shown at procedure 930, the query plan is retrieved. In one embodiment, as shown at procedure 940, the path of execution of the query plan is executed to resolve the received query. At procedure 950, a result of the path of execution is returned as a response to the received query.

Figure 10:
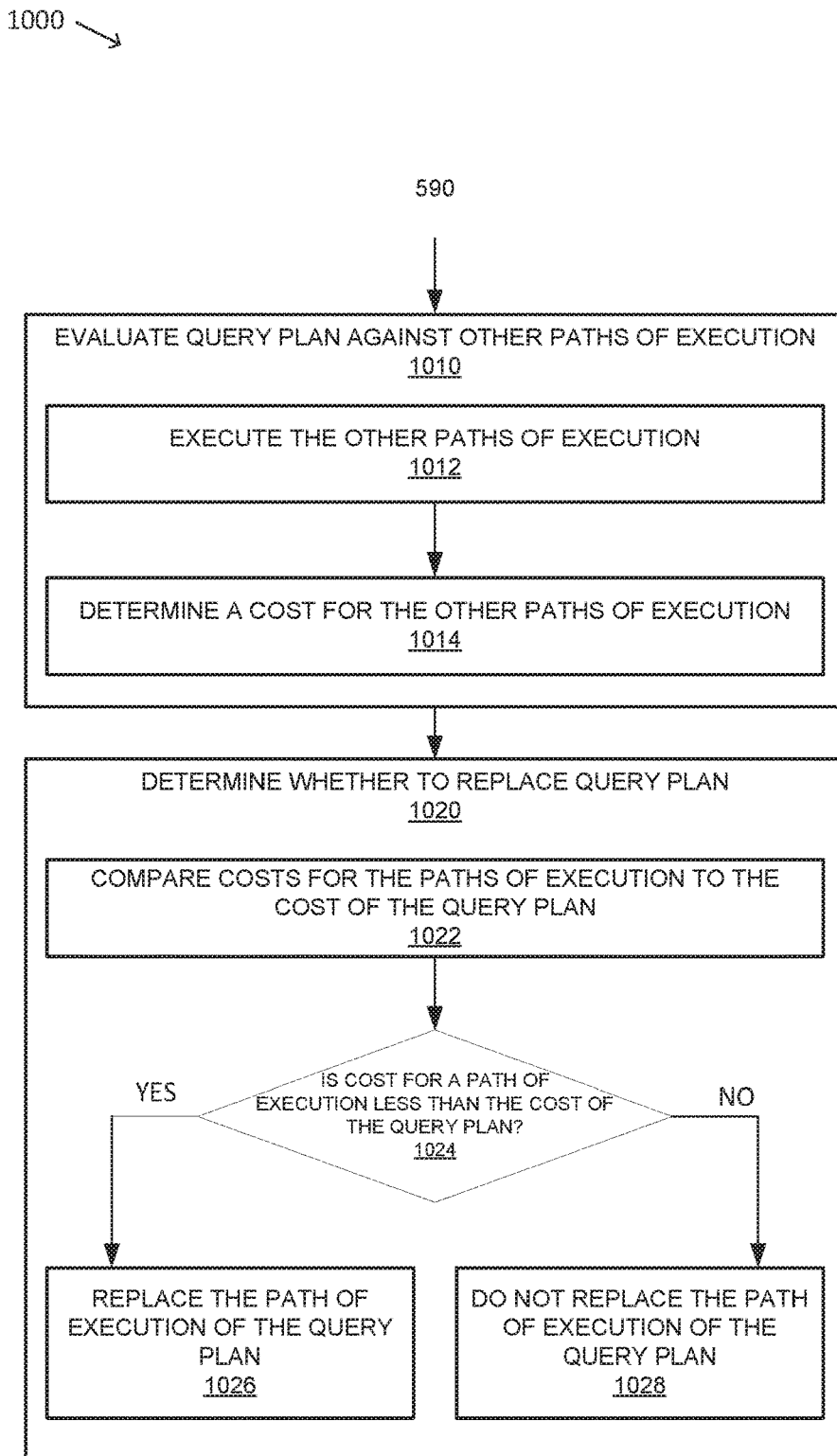
FIG. 10 depicts a flow diagram for evaluating a cached query plan, according to various embodiments.

In some embodiments, the stored query plan is evaluated offline to confirm whether the generated query plan should be saved or it should be replaced with another query plan. For example, the multiple stage analysis of a query may result in a particular query plan as the least costly query plan. However, due to the culling of costly paths of execution during the multiple stage query analysis, there may be less costly path of execution. Offline, in a non-time sensitive environment, the path of execution of the query plan can be compared to other paths of execution (e.g., without culling paths during analysis). FIG. 10 depicts a flow diagram 1000 for evaluating a cached query plan, according to various embodiments.

In one embodiment, the query plan is cached (e.g., at procedure 590 of flow diagram 500). At procedure 1010 of flow diagram 1000, the query plan including the path of execution is evaluated against a plurality of paths of execution for the query. In one embodiment, as shown at procedure 1012, the query plan including the path of execution is evaluated against a plurality of paths of execution for the query includes executing the plurality of paths of execution for the query. At procedure 1014, a cost for each of the plurality of paths of execution for the query is determined. In one embodiment, evaluating the query plan including the path of execution against a plurality of paths of execution of the query plan is performed off-line in a non-time sensitive environment.

At procedure 1020, based on the evaluating, it is determined whether to replace the query plan as cached with another query plan including a path of execution of the plurality of paths of execution. In one embodiment, as shown at procedure 1022, a cost of the path of execution of the query plan is compared to costs for the plurality of paths of execution for the query. At procedure 1024, it is determined whether a cost of a path of execution of the plurality of paths of execution less than a cost of the path of execution of the query plans. For example, an aggregate cost can be determined for each path of execution, and the aggregate cost for each path of execution can be compared. If the stored path of execution is not the least costly path of execution, the query plan can be replaced with another path of execution that is less costly. If a cost of a path of execution of the plurality of paths of execution is less than the cost of the path of execution of the query plan as cached, as shown at procedure 1026, the path of execution of the query plan as cached is replaced with the path of execution of the plurality of paths of execution. Alternatively, if a cost of a path of execution of the plurality of paths of execution is not less than the cost of the path of execution of the query plan as cached, as shown at procedure 1028, the path of execution of the query plan as cached is not replaced.

It is noted that any of the procedures, stated above, regarding the flow diagrams of FIGS. 5-10 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for caching a generated query plan for time series data, the method comprising:
generating a query plan for time series data based on a query comprising elements and operators between the elements, the query plan comprising a path of execution for resolving the query, the generating the query plan comprising:
parsing the query to identify the elements and the operators between the elements;
determining stages for a plurality of paths of execution based at least in part on the elements and the operators;
performing a multiple stage analysis of a plurality of paths of execution for resolving the query, wherein the plurality of paths of execution is evaluated after completion of each stage and a subset of paths of execution is selected for continued execution and evaluation after the completion of a stage of the multiple stage analysis; and
selecting the path of execution from the plurality of paths of execution based at least in part on the multiple stage analysis;
executing the path of execution of the query plan to resolve the query;
returning a result of the path of execution as a response to the query;
caching the query plan for retrieval and execution responsive to receiving another query that matches the query, such that the query plan can be used to resolve the another query;
evaluating the query plan comprising the path of execution against a plurality of paths of execution for the query, wherein the evaluating is performed without culling any path of execution from the plurality of paths of execution; and
determining, based on the evaluating, whether to replace the query plan as cached with another query plan comprising a path of execution of the plurality of paths of execution.

2. The method of claim 1, further comprising:
responsive to determining that a received query matches the query associated with the query plan, retrieving the query plan; and
executing the path of execution of the query plan to resolve the received query; and
returning a result of the path of execution as a response to the received query.

3. The method of claim 1, further comprising:
replacing, based on the determining, the query plan as cached with a query plan comprising a path of execution of the plurality of paths of execution.

4. The method of claim 1, wherein the evaluating the query plan comprising the path of execution against a plurality of paths of execution of the query plan is performed off-line in a non-time sensitive environment.

5. The method of claim 1, wherein the evaluating the query plan comprising the path of execution against a plurality of paths of execution for the query comprises:
executing the plurality of paths of execution for the query; and
determining a cost for each of the plurality of paths of execution for the query.

6. The method of claim 5, wherein the determining, based on the evaluating, whether to replace the query plan as cached with another query plan comprising a path of execution of the plurality of paths of execution comprises:
comparing a cost of the path of execution of the query plan to costs for the plurality of paths of execution for the query; and provided a cost of a path of execution of the plurality of paths of execution is less than the cost of the path of execution of the query plan as cached, replacing the path of execution of the query plan as cached with the path of execution of the plurality of paths of execution.

7. The method of claim 1, wherein the generating a query plan for time series data based on a query is performed in real-time.

8. The method of claim 1, wherein the performing the multiple stage analysis of a plurality of paths of execution for resolving the query comprises:
evaluating executed paths of execution at a completion of an executed stage, wherein the evaluating is based at least in part on a cost associated with an executed stage for each executed path of execution; and
selecting, based on the evaluating, executed paths for continued execution and evaluation.

9. A non-transitory computer readable storage medium having computer readable program code stored thereon for causing a computer system to perform a method for caching a generated query plan for time series data, the method comprising:
generating a query plan for time series data based on a query comprising elements and operators between the elements, the query plan comprising a path of execution for resolving the query, the generating the query plan comprising:
parsing the query to identify the elements and the operators between the elements;
determining stages for a plurality of paths of execution based at least in part on the elements and the operators;
performing a multiple stage analysis of a plurality of paths of execution for resolving the query, wherein the plurality of paths of execution is evaluated after completion of each stage and a subset of paths of execution is selected for continued execution and evaluation after the completion of a stage of the multiple stage analysis; and
selecting the path of execution from the plurality of paths of execution based at least in part on the multiple stage analysis;
caching the query plan for retrieval and execution responsive to receiving another query that matches the query, such that the query plan can be used to resolve the another query;
evaluating the query plan comprising the path of execution against a plurality of paths of execution for the query, wherein the evaluating is performed without culling any path of execution from the plurality of paths of execution; and
determining, based on the evaluating, whether to replace the query plan as cached with another query plan comprising a path of execution of the plurality of paths of execution.

10. The non-transitory computer readable storage medium of claim 9, the method further comprising:
executing the path of execution of the query plan to resolve the query; and
returning a result of the path of execution as a response to the query.

11. The non-transitory computer readable storage medium of claim 9, the method further comprising:
responsive to determining that a received query matches the query associated with the query plan, retrieving the query plan; and
executing the path of execution of the query plan to resolve the received query; and
returning a result of the path of execution as a response to the received query.

12. The non-transitory computer readable storage medium of claim 9, the method further comprising:
replacing, based on the determining, the query plan as cached with a query plan comprising a path of execution of the plurality of paths of execution.

13. The non-transitory computer readable storage medium of claim 9, wherein the evaluating the query plan comprising the path of execution against a plurality of paths of execution of the query plan is performed off-line in a non-time sensitive environment.

14. The non-transitory computer readable storage medium of claim 9, wherein the evaluating the query plan comprising the path of execution against a plurality of paths of execution for the query comprises:
executing the plurality of paths of execution for the query; and
determining a cost for each of the plurality of paths of execution for the query.

15. The non-transitory computer readable storage medium of claim 14, wherein the determining, based on the evaluating, whether to replace the query plan as cached with another query plan comprising a path of execution of the plurality of paths of execution comprises:
comparing a cost of the path of execution of the query plan to costs for the plurality of paths of execution for the query; and
provided a cost of a path of execution of the plurality of paths of execution is less than the cost of the path of execution of the query plan as cached, replacing the path of execution of the query plan as cached with the path of execution of the plurality of paths of execution.

16. The non-transitory computer readable storage medium of claim 9, wherein the performing the multiple stage analysis of a plurality of paths of execution for resolving the query comprises:
evaluating executed paths of execution at a completion of an executed stage, wherein the evaluating is based at least in part on a cost associated with an executed stage for each executed path of execution; and
selecting, based on the evaluating, executed paths for continued execution and evaluation.

17. A system for caching a generated query plan for time series data, the system comprising:
a data storage unit; and
a processor communicatively coupled with the data storage unit, the processor configured to:
generate, in real-time, a query plan for time series data based on a query comprising elements and operators between the elements, the query plan comprising a path of execution for resolving the query, wherein the query plan is generated by parsing the query to identify the elements and the operators between the elements, determining stages for a plurality of paths of execution based at least in part on the elements and the operators, performing a multiple stage analysis of a plurality of paths of execution for resolving the query, wherein the plurality of paths of execution is evaluated after completion of each stage and a subset of paths of execution is selected for continued execution and evaluation after the completion of a stage of the multiple stage analysis, and selecting the path of execution from the plurality of paths of execution based at least in part on the multiple stage analysis;

cache the query plan for retrieval and execution responsive to receiving another query that matches the query, such that the query plan can be used to resolve the another query;

perform, off-line in a non-time sensitive environment, an evaluation of the cached query plan comprising the path of execution against a plurality of paths of execution for the query, wherein the evaluation is performed without culling any path of execution from the plurality of paths of execution; and selectively replace the cached query plan with another query plan comprising a path of execution of the plurality of paths of execution based on the evaluation;

retrieve the cached query plan in response to determining that a second query matches the query associated with the cached query plan;

execute the path of execution of the cached query plan to resolve the second query; and return a result of the path of execution of the cached query plan as a response to the second query.

* * * * *